United States Patent
Korytnikov

(10) Patent No.: US 8,148,024 B2
(45) Date of Patent: Apr. 3, 2012

(54) METHOD AND APPARATUS FOR PEM FUEL CELL FREEZING PROTECTION

(76) Inventor: Konstantin Korytnikov, Ontario (CA)

( * ) Notice: Subject to any disclaimer, the term of this patent is extended or adjusted under 35 U.S.C. 154(b) by 90 days.

(21) Appl. No.: 12/752,101

(22) Filed: Mar. 31, 2010
(Under 37 CFR 1.47)

(65) Prior Publication Data

US 2011/0081588 A1    Apr. 7, 2011

Related U.S. Application Data

(60) Provisional application No. 61/165,430, filed on Mar. 31, 2009.

(51) Int. Cl.
*H01M 8/04*    (2006.01)
*H01M 8/18*    (2006.01)

(52) U.S. Cl. ........ 429/429; 429/428; 429/417; 429/434; 429/492

(58) Field of Classification Search ............ 429/429, 429/428, 416, 417, 422, 434, 436, 443, 492, 429/491
See application file for complete search history.

(56) References Cited

U.S. PATENT DOCUMENTS

| | | |
|---|---|---|
| 6,103,410 A | 8/2000 | Fuller et al. |
| 6,127,056 A | 10/2000 | Wheeler et al. |
| 6,358,638 B1 | 3/2002 | Rock et al. |
| 2003/0162063 A1 | 8/2003 | Yoshizawa et al. |
| 2004/0013915 A1 | 1/2004 | Matsuoka |
| 2006/0068249 A1* | 3/2006 | Fredette ........................ 429/22 |
| 2007/0087233 A1* | 4/2007 | Blaszczyk et al. ............ 429/13 |
| 2009/0263683 A1* | 10/2009 | Baumann et al. ............. 429/17 |
| 2010/0239927 A1* | 9/2010 | Moran et al. ................. 429/429 |

FOREIGN PATENT DOCUMENTS

JP    7169476 A    7/1995

* cited by examiner

*Primary Examiner* — Raymond Alejandro

(74) *Attorney, Agent, or Firm* — Novak Druce + Quigg LLP

(57) ABSTRACT

A low temperature PEM fuel cell system is prevented against freezing after a shutdown in sub-freezing conditions. The fuel cell can be heated by filling an anode chamber with a fuel (the hydrogen or a hydrogen-rich reactant gas) and generating the hydrogen on a cathode. A defined amount of air is supplied to the cathode chamber. The fuel cell is locally heated to a defined temperature by the exothermic chemical reaction between the hydrogen and the oxygen on a cathode catalyst. Once the fuel cell is warmed to the defined temperature, the hydrogen generation on the cathode and the air supply can be discontinued. Water formed at the cathode can be evaporated by means of pre-heating of an air flow. This procedure provides plain saturation of the cathode with the hydrogen and, as result, mild, safe heating the fuel cell without use of an additional external power supply.

1 Claim, 5 Drawing Sheets

METHOD AND APPARATUS FOR PEM FUEL CELL FREEZING PROTECTION

CROSS-REFERENCE TO RELATED APPLICATIONS

This Application claims the benefit of U.S. Provisional Application No. 61/165,430, filed on Mar. 31, 2009, which is incorporated herein by reference in its entirety.

FIELD OF THE INVENTION

The invention relates in general to fuel cells and, more particularly, to fuel cells or devices powered by fuel cells that are subjected to sub-freezing temperatures.

BACKGROUND OF THE INVENTION

Fuel cells generate electrical power that can be used in a variety of applications. Fuel cells constructed with proton exchange membranes (PEM fuel cells) may eventually replace the internal combustion engine in motor vehicles. PEM fuel cells have an ion exchange membrane, partially comprised of a solid electrolyte, affixed between an anode and a cathode. To produce electricity through an electrochemical reaction, hydrogen is supplied to the anode and air is supplied to the cathode. An electrochemical reaction between the hydrogen and the oxygen in the air produces an electrical current, with water and heat as reaction products. This water is removed from the cathode.

The ion exchange membrane commonly used in PEM fuel cells is partially comprised of a sulphonated chemical compound that binds water in the membrane in order to ensure sufficient proton conductivity. At ambient temperatures below zero degrees Celsius, water contained in the membrane can freeze. When such freezing occurs, the electrical resistance of the membrane can increase by two to three orders of magnitude.

Conventional fuel cells can only produce current at temperatures above a defined starting temperature, which is currently approximately 5 degrees Celsius. In the event of a cold start (i.e. temperatures at or below approximately 5 degrees Celsius), a fuel cell must first be heated to a temperature above the starting temperature. Because of the considerable mass of fuel cell components, the required increase in temperature can only be achieved if a large amount of thermal energy is realized and such thermal energy is then transferred to fuel cells. In current fuel cell systems, it is not possible to start a frozen fuel cell within times similar to those achieved for internal combustion engines. Further, due to the expansion of water in a solid phase (ice), freezing will inevitably cause damage to the delicate porous structure of a fuel cell and, consequently, a degradation of its performance.

Considerable effort has been directed toward accelerating the rate at which a PEM fuel cell system can be heated to above-freezing temperatures. For instance, the introduction of an $H_2$/air mixture into a fuel cell stack can be used to initiate an exothermal chemical reaction. According to U.S. Pat. No. 6,127,056, during start up, a fuel cell is warmed to operating temperature by introducing a small amount of the hydrogen into an air flow at an air inlet of the fuel cell where the hydrogen and the oxygen react at a catalyst surface to produce heat. The drawback of this approach is that the warmed substance is remote relative to the cathode where the typical electrochemical reaction occurs under the general operation of the fuel cell. In U.S. Pat. No. 6,103,410, an $H_2$/air mixture is delivered into oxidant channels and reacts on a catalyst disposed in hydrophobic regions of the cathode. U.S. Pat. No. 6,358,638 teaches a method in which a membrane electrode assembly (MEA) is locally heated from below freezing to a suitable operating temperature by the exothermal chemical reaction between $H_2$ and $O_2$ on the anode and/or cathode catalysts. The hydrogen is introduced into an $O_2$-rich cathode feed stream and/or $O_2$ is introduced into a $H_2$-rich anode feed stream. One considerable disadvantage of the approach in the '410 and '638 patents is the fact that a heated zone is mainly restricted to an electrode area in the proximity to a fuel cell inlet. Overheating eventually causes damage to fuel cell components. In all the above-mentioned systems, auxiliary apparatus is needed to provide gas mixture preparation.

In U.S. Patent Application Publication No. 2004/0013915 A1, a PEM fuel cell is heated from a temperature below the freezing point (0 degrees Celsius) by supplying hydrogen to an anode so as to form water by combining with oxygen generated at the anode by the electrolysis of the frozen water. Further, the oxygen is supplied to the cathode so as to form water by combining with the hydrogen generated at the cathode by the electrolysis of the frozen water. The application of that concept relies on sufficient power diverted from a secondary battery (at −30 degrees Celsius, a voltage of 2.4 V must be applied to each fuel cell). Meanwhile, a secondary battery itself has very low performance characteristics at sub-freezing temperatures. A plot of the oxygen generation on the anode indicates that this design requires a more significant noble metal load in an anode catalyst than is used in modern fuel cells.

Japanese Patent No. JP-7169476 discloses a method of protecting a fuel cell against freezing of water by warming the fuel cell with an electrical heater, so that the temperature of a fuel cell does not fall below 0 degrees Celsius. However, if the fuel cell stops running for a long time, the amount of electrical energy required to protect the fuel cell becomes very significant. U.S. Patent Application Publication No. 2003/0162063 A1 teaches protecting a fuel cell against freezing by, first, draining water from the fuel cell to decrease its thermal capacity and, second, using an electrical or catalytic heater to keep a temperature of the fuel cell above 0 degrees Celsius. This approach also results in large amounts of electrical energy or fuel being required in the method.

SUMMARY

Aspects of the invention are directed to methods and systems to protect a PEM fuel cell or a fuel cell stack against freezing, particularly when shut down and while exposed to sub-freezing environmental conditions. Aspects of the invention can overcome the above-mentioned disadvantages of the heretofore-known systems. Aspects of the invention can protect fuel cell components from damage and corrosion, enable keeping such PEM fuel systems suitable to self-sustaining operation, and permit the starting of PEM fuel cells without the use of external heating means and auxiliary apparatus.

In one respect, aspects of the invention are directed to a method to prevent freezing a PEM fuel cell system after shutdown at a sub-freezing ambient temperature. The fuel cell system has a PEM fuel cell or a stack of fuel cells each with a proton-exchange membrane between a cathode and an anode. An air supply (a blower or a compressor) can be included as an element of an external electrical circuit of the fuel cell stack to deliver the air or the oxygen over the cathode. An electrical heater can be provided at an air inlet of the fuel cell stack connectable in the external electrical circuit. The system can include a source of a fuel (hydrogen or a hydrogen-containing mixture). A sensor can be provided for measuring a fuel cell stack temperature. A method according to aspects of the invention can comprise various steps if a temperature of the fuel cell stack monitored with the sensor is lower than a defined value above 0 degrees Celsius. For instance, hydrogen can be supplied to the anode from the source of a fuel. The anode can be connected to the cathode through the external circuit. As a result, several events can occur: dissociation of the hydrogen at the anode into hydrogen ions and electrons; conducting the electrons (electrical current) by means of the external electrical circuit to the cathode due to a difference in hydrogen partial pressure between the anode and the cathode in according with Nernst equation; passing the hydrogen ions from the anode through the proton-exchange membrane to the cathode (the electrochemical hydrogen pump effect); combining the hydrogen ions with the electrons to generate the hydrogen (hydrogen reduction); exothermal reaction of the hydrogen with the oxygen contained in a feed air supplied with the air supply enabled by a electrical current generated by the fuel cell stack; warming the feed air with the electrical heater enabled with a electrical current generated by the fuel cell stack.

A flow of the feed air can be restricted by an oxygen amount required for the chemical reaction with hydrogen evolving on the cathode. It is achieved by keeping a value of the electrical current supplied to the air supply in a defined direct proportion to an electrical current flowing in the external electrical circuit.

Aspects of the invention can concern methods to maintain a fuel cell relatively warm and able to the self-sustained operation by electrochemical delivery of the hydrogen from the anode to the cathode and uniform chemical oxidation of the hydrogen on the entire surface of a cathode catalyst by the oxygen contained in the feed air. Because the above-mentioned electrochemical conversion generates the electrical current, aspects of the invention can rely on a fuel cell itself rather than on another power backup system as a power supply to provide power to the air supply as a delivery means of the feed air.

If the fuel cell is warmed to a defined temperature, the system and method can enter a passive phase. In this phase, the fuel cell can be disconnected from the external electrical circuit and hydrogen supply to the anode can be stopped.

System and methods according to aspects of the invention can further include a membrane humidifier of the feed air disposed upstream regards to the heater. A thermal sensor can be provided for monitoring a temperature of the feed air downstream of the heater. A cooling sub-system can be provided to allow a coolant to bypass a heat exchanger by a small loop including a coolant compartment of the fuel cell. An electronically adjustable regulator can be provided to secure and/or maintain the hydrogen pressure at the anode of the fuel cell. Thermo-insulation covers can be provided for the fuel cell and the humidifier. While the fuel cell is being warmed (an active phase of the method), the heater can be powered by the electrical current generated by the fuel cell so that the feed air is pre-heated to a defined temperature, thereby allowing the water (as a product of chemical reaction between the hydrogen and the oxygen) to be evaporated from the cathode, and, thus, preventing the fuel cell against flooding. The feed air temperature measured with the thermal sensor can be maintained with respect to a value of the electrical current generated by the fuel cell expressing, in its turn, an amount of water formed at the cathode. A warm cathode exhaust (mainly the nitrogen) can flow out of the fuel cell system through the humidifier, thereby preventing its membrane against damage due to freezing. In an active phase according to aspects of the invention, the cooling sub-system can pass a coolant through the fuel cell in the small loop to provide, on one hand, uniform heat distribution throughout the fuel cell and to avoid, on another hand, a significant thermal loss in the heat exchanger. Hydrogen supply to the anode at variable pressure by the hydrogen pressure regulator can allow the fuel cell system to adjust the rate of heat generation to the environmental temperature because the electrochemical hydrogen pump is driven due to the fuel cell voltage, dictated by the difference in hydrogen partial pressure between the anode and the cathode. The thermo-insulation covers of the fuel cell and the humidifier (elements of the system exposed to potential damage under freezing) can help to prevent the heat dissipating during a passive phase according to aspects of the invention.

One advantage of a system and/or method according to aspects of the invention is that, while the fuel cell system is at rest and exposed to sub-freezing environmental conditions, direct, mild, even, and/or safe heating of the entire cathode surface (a place of water formation in a fuel cell) is provided on demand when the fuel cell temperature declines to 0 degrees Celsius without a backup of auxiliary power source.

Storage of the fuel cell in the passive phase of the method in an absence of the oxygen protects the cathode against being exposed to the oxygen potential and, as result, against accelerated corrosion in materials of the cathode.

Aspects of the invention are directed to a method and apparatus to protect a shut down PEM fuel cell against freezing. A fuel cell system according to aspects of the invention can have at least one PEM fuel cell with a proton-exchange membrane between a cathode and an anode. An external electrical circuit can be connected to the cathode and the anode. A feed air supply can be in fluid communication with the cathode by means of a cathode line and in electrical communication with the external electrical circuit. A source of a fuel containing hydrogen can be in fluid communication with the anode by means of an anode line. An electrical heater can be disposed on the cathode line and in electrical communication with the external electrical circuit. The system can also include a sensor that can measure a temperature of a fuel cell.

A method according to aspects of the invention can involve switching to an active phase initiated if a temperature of the fuel cell monitored with the sensor is lower than a defined value $t_1>0$ degrees Celsius. In such case, fuel can be supplied to the anode from the source of the fuel. Further, the anode can be connected to the cathode of the fuel cell to the external electrical circuit, which can causes events such as: dissociation of the hydrogen at the anode into hydrogen ions and electrons; conducting an electrical current as a flow of the electrons by means of the external electrical circuit to the cathode due to the difference in hydrogen partial pressure between the anode and the cathode; passing the hydrogen ions from the anode through the proton-exchange membrane to the cathode; combining the hydrogen ions with the electrons to generate the hydrogen at the cathode; exothermal chemical reacting the hydrogen generated at the cathode with the oxygen supplied with the feed air supply at a rate around the stoichiometric ratio for the chemical reaction; and warming the feed air with the electrical heater.

A method according to aspects of the invention can also involve switching to a passive phase initiated if a temperature of the fuel cell monitored with the sensor achieves a defined value $t_2$ above the defined value $t_1$. In such case, a method according to aspects of the invention can include the steps of: discontinuing a supply of the fuel to the anode from the source of the fuel; disconnecting the feed air supply and the electrical heater from the external electrical circuit; and disconnecting the anode to the cathode of the fuel cell to the external electrical circuit.

The fuel cell system can include a thermal sensor that can measure a temperature of a feed air in the cathode line downstream of the electrical heater. In such case, a method according to aspects of the invention can involve, in the active phase, pre-heating the feed air with the electrical heater to a defined temperature allowing the full evaporation of the water as a product of the chemical reaction between the hydrogen and the oxygen at the cathode.

The fuel cell system can include a cooling sub-system that allows a coolant to bypass a heat exchanger by a small loop including the fuel cell. In such case, a method according to aspects of the invention can include, in the active phase, the circulation of a coolant in by the small loop.

The fuel cell system can include a humidifier that has a feed air compartment that is in fluid communication with the cathode through the feed air line. A cathode exhaust compartment can be in fluid communication with the cathode through a cathode exhaust line. A water permeable membrane can separate the compartments. In such case, a method according to aspects of the invention can include, in the active phase, providing by means of the feed air supply a flow of the feed air across the feed air compartment and a flow of a cathode exhaust across the cathode exhaust compartment. The fuel cell system can further include thermo-insulation covers of the fuel cell and the humidifier.

The fuel cell system can include a pressure regulator disposed at the fuel line and securing the hydrogen pressure in the anode of the fuel cell. In such case, a method according to aspects of the invention can include, in the active phase, adjusting the hydrogen pressure in the anode by means of the pressure regulator in response to a change in an ambient temperature.

Although the invention is illustrated and described herein as embodied in a method and apparatus for PEM fuel cell freezing protection, it is nevertheless not intended to be limited to the details shown, since various modifications and structural changes may be made therein without departing from the spirit of the invention and within the scope and range of equivalents of the claims.

DETAILED DESCRIPTION OF THE INVENTION

Embodiments of the invention are directed to systems and methods for protecting a PEM fuel cell against freezing. Aspects of the invention will be explained in connection with one possible system and method, but the detailed description is intended only as exemplary. Embodiments of a system and method according to aspects of the invention are shown in FIGS. 1-5, but the present invention is not limited to the illustrated structure or application.

Figure 1:
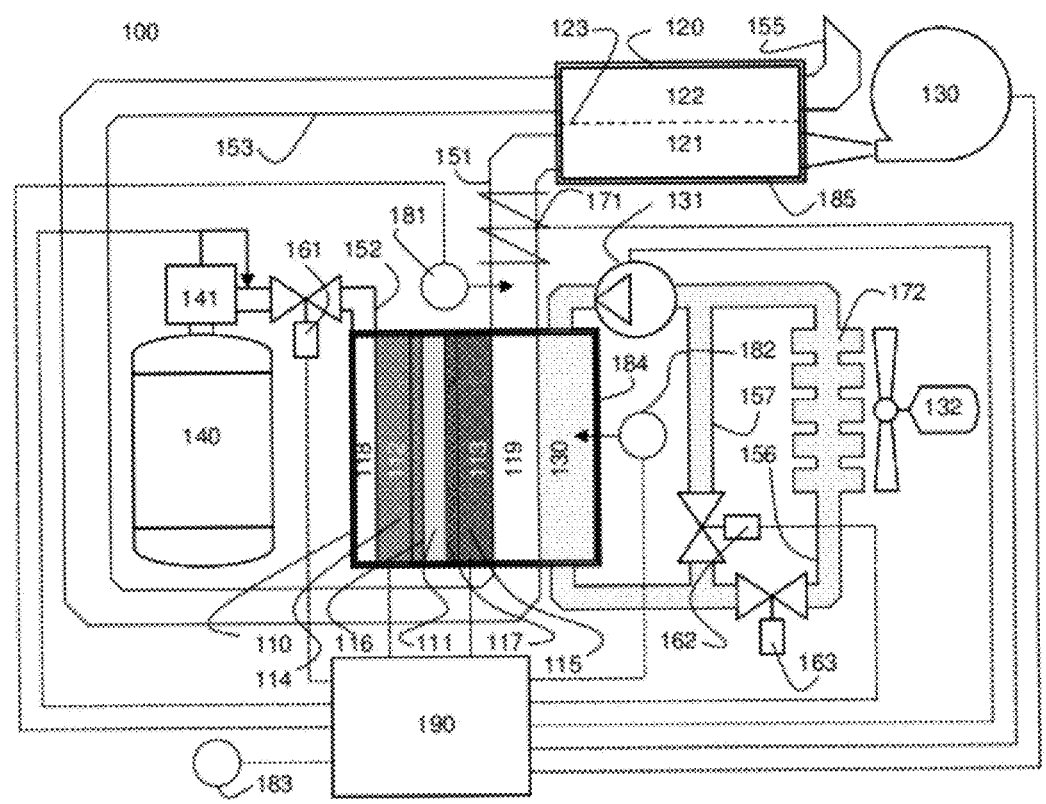
FIG. 1 is a view of an embodiment of a fuel cell system in accordance with aspects of the invention.

Referring to FIG. 1, one embodiment of apparatus and a corresponding method to protect a shut down PEM fuel cell against freezing is shown. The fuel cell system and apparatus is generally designated by the reference number 100. The system includes a fuel cell 110 having an anode 112, a cathode 113 and a proton exchange membrane (PEM, also referred to as a polymer electrolyte membrane) 111.

The anode 112, which may also referred to as a hydrogen electrode, includes an anode diffusion substrate 114 having an anode catalyst layer 116 disposed thereon on the side of the substrate 114 facing the PEM 111. The cathode 113, which may also referred to as a oxygen electrode, includes a cathode diffusion substrate 115, having a cathode catalyst layer 117 disposed thereon on the side of the substrate facing the PEM 111. The fuel cell 110 also includes an anode flow field 118 adjacent the anode diffusion substrate 114 and a cathode flow field 119 adjacent the cathode diffusion substrate 115. Each fuel cell 110 incorporates a coolant compartment 130 (shown in FIG. 1 as adjusted to the cathode flow field 119) to carry a cooling fluid, such as water or glycol and i.e., for heat management in the fuel cell 110.

In the general operation of a fuel cell, the hydrogen electrode 114 electrochemically splits electrons off from the hydrogen and conducts them into an external circuit to produce the electromotive force forming the power output of the fuel cell. The electrons, after flowing through the external circuit, are once more electrochemically recombined with the hydrogen ions and with the oxygen on the oxygen electrode 113, where water is formed. The proton exchange membrane 111 is an electrolyte which allows the hydrogen ions $H^+$ to pass through, but it blocks the electrons. The catalyst layers 116, 117 can enhance the electrochemical reactions. The PEM fuel cell can operate at relatively low temperatures (about 80 degrees Celsius, about 175 degrees Fahrenheit). A fuel cell that operates at or below these temperatures can be referred to as a "low temperature fuel cell".

The cathode flow field 119 can comprise a plurality of channels to carry a feed air over the cathode 113 from a feed air line 151 to a cathode exhaust line 153. The feed air line 151 and the cathode exhaust line 153 can be any suitable structure. Similarly, the anode flow field 118 can comprise a plurality of channels to distribute the hydrogen to the anode 114 from a hydrogen line 152. The hydrogen line 152 can be any suitable structure. The feed air line 151 can be in fluid communication with an air moving device, such as an air blower 130, through a feed air compartment 121 of a humidifier 120. The cathode exhaust line 153 can be in fluid communication with a cathode exhaust compartment 122 of the humidifier 120. The humidifier 120 can also include a membrane 123 separating the compartments 121, 122. The membrane 123 can be selectively permeable to water. The hydrogen line 152 can be in fluid communication with any suitable hydrogen source, such as hydrogen tank 140, through a solenoid valve 161 and a pressure regulator 141 electronically adjustable for different pressure values. An electrical heater 171 can be mounted at the feed air line 151 downstream of the humidifier 120 relative to the direction of flow in the feed air line 151. The electrical heater 171 can be operatively associated with the feed air line 151 to directly and/or indirectly heat the air flow in the air feed line 151. A thermal sensor 181 can be installed in the feed air line 151 downstream of the electrical heater 171 relative to the direction of flow in the feed air line. The thermal sensor 181 can be operatively associated with the feed air line 151 to determine a temperature of the flow within the feed air line 151.

The system 100 can include a coolant sub-system comprising a coolant pump 131, a heat exchanger 172 and a fan 132 as means for heat removal from the system 100. The coolant sub-system can further include solenoid valves 162, 163, a coolant by-pass line 157 and a thermal sensor 182 installed in the fuel cell 110 (preferably in the coolant compartment 130). The thermal sensor 182 can be operatively associated with the fuel cell 110 to determine a temperature of the fuel cell 110. A small coolant loop can be defined at least in part by the coolant compartment 130 of the fuel cell 110, the solenoid valve 162, the coolant by-pass line 157 and the coolant pump 131.

The system 100 can include a thermal sensor 183, which can monitor the ambient temperature ($t_a$). Thermo-insulation cases 184, 185 can be used to cover the fuel cell 110 and the humidifier 120, respectively.

A controller 190 can be operatively connected to the fuel cell 110 and, more particularly, to the anode 112 and the cathode 113. The controller 190 can be operatively connected to other elements of the system 100, including, for example, the blower 130, the heater 171, the pump 131, one or more of the solenoid valves 161, 162, 163, one or more of the thermal sensors 181, 182, 183, and/or the pressure regulator 141. The controller 190 can provide a power management, control and/or monitoring during operation of the fuel cell 110, including during methods to protect a shut down PEM fuel cell against freezing.

Figure 2:
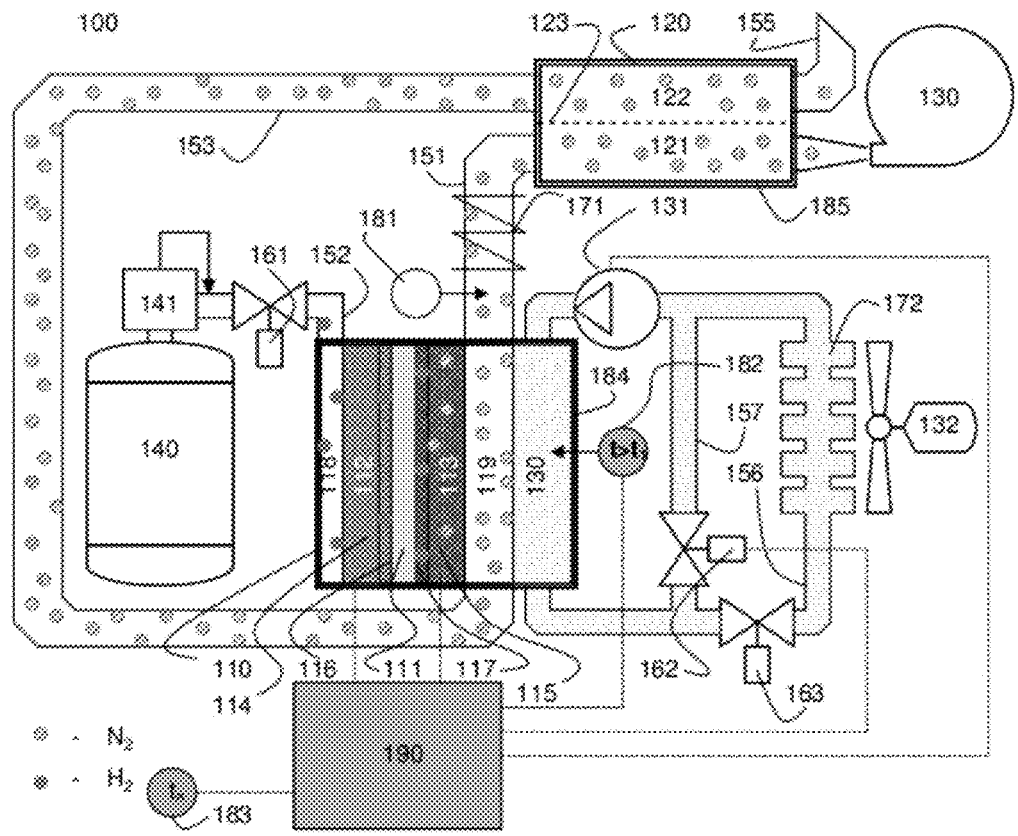
FIG. 2 is a view of a passive phase of an embodiment of a fuel cell system in accordance with aspects of the invention.

Referring to FIG. 2, a passive phase of a method to protect a shut down PEM fuel cell against freezing is shown. When the temperature of the fuel cell 110, as monitored with thermal sensor 182, is above a pre-determinate value ($t_1$) that is greater than 0 degrees Celsius. In FIG. 2 (as well as in FIGS. 3-5), dash lines are only applied to the elements of the system 100 which may be in active communication with the controller 190 at any given time. In addition, activated elements of the system 100 are highlighted by a darkened background. The pressure regulator 141 can be electronically adjusted relative to an ambient temperature monitored by the thermal sensor 183 according to logic expressed as: the lower ambient temperature (if below 0 degrees Celsius), the higher hydrogen pressure that is allowed downstream of the pressure regulator 141.

Figure 3:
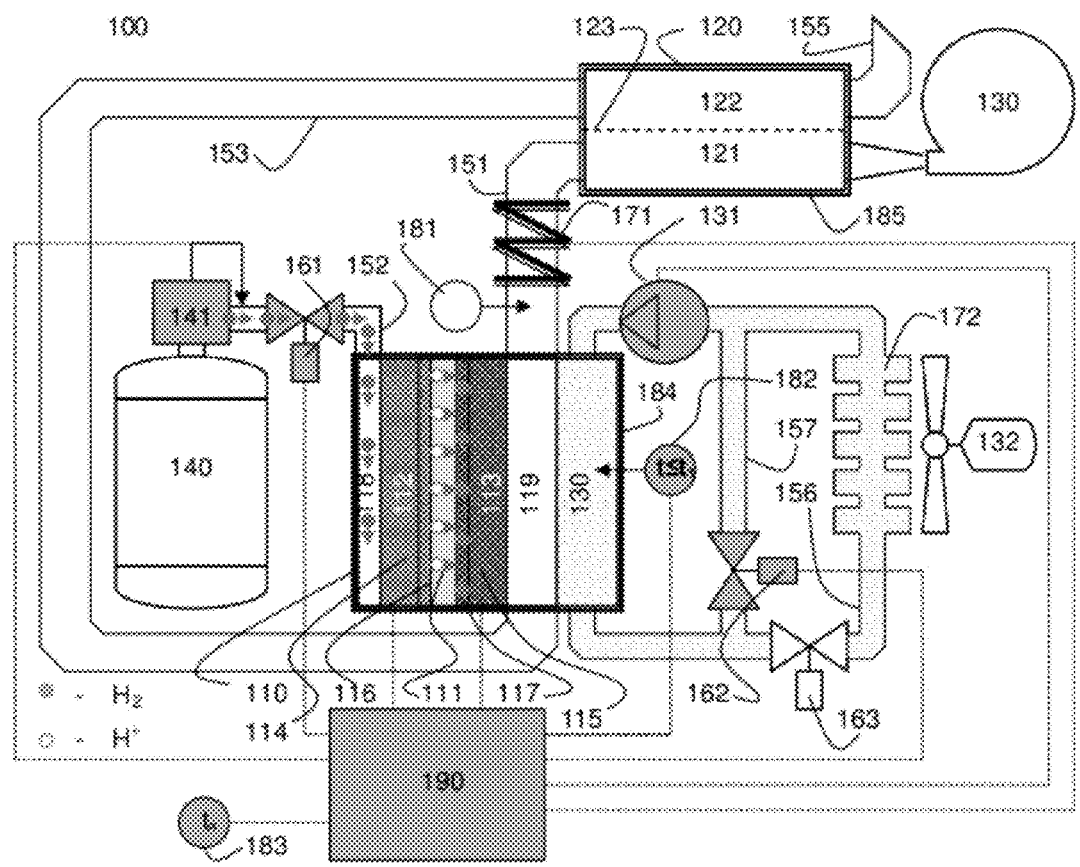
FIG. 3 is a view of a first step of an active phase of an embodiment of a fuel cell system in accordance with aspects of the invention.
Figure 4:
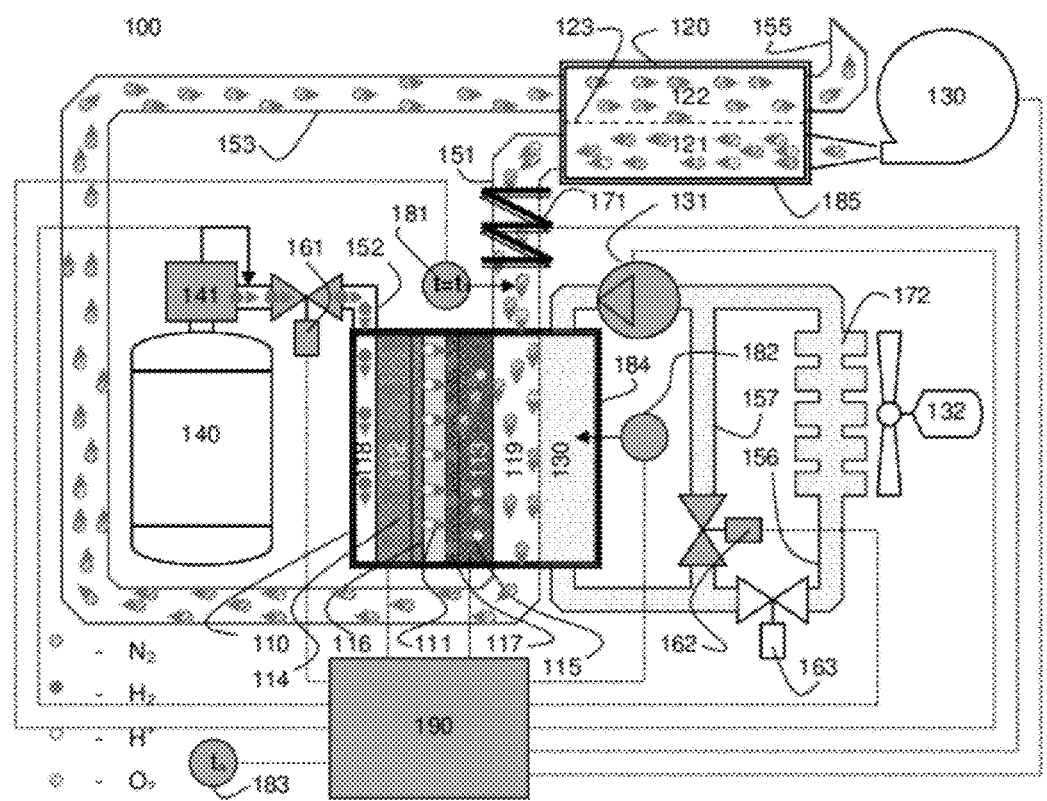
FIG. 4 is a view of a second step of the active phase of an embodiment of a fuel cell system in accordance with aspects of the invention.
Figure 5:
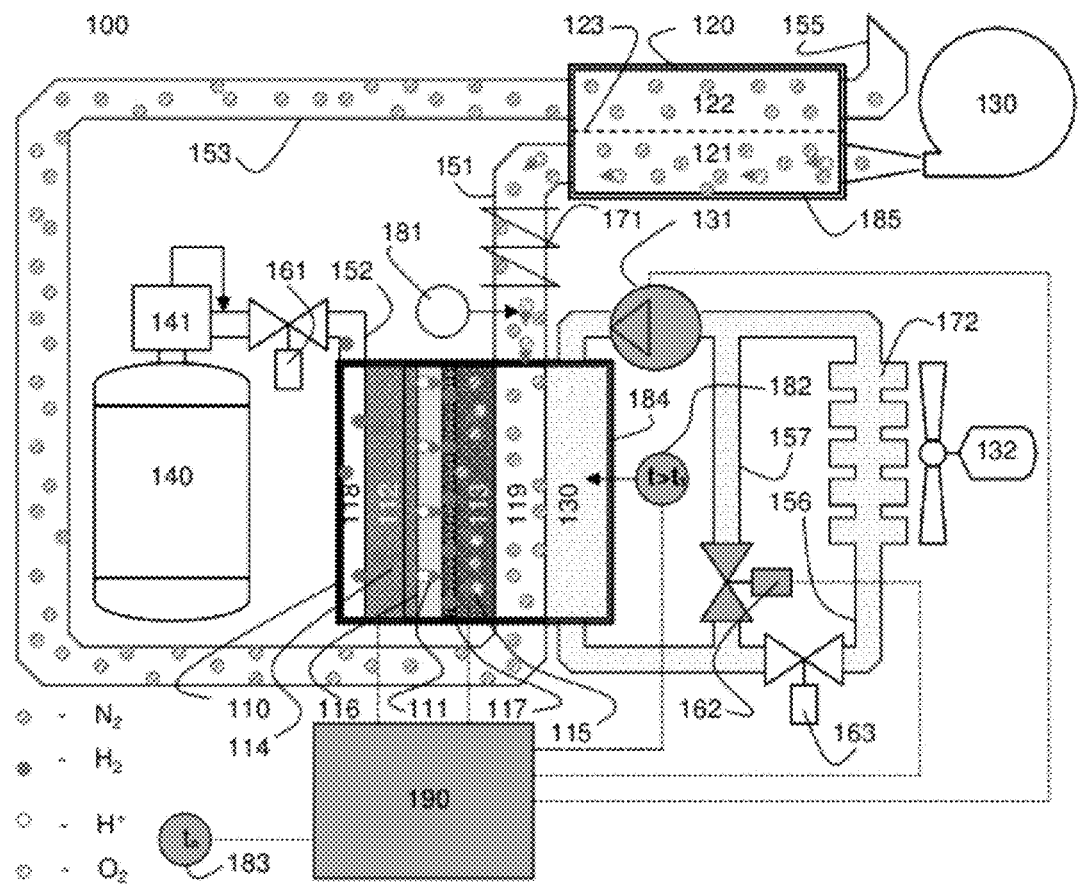
FIG. 5 is a view of a third step of the active phase of an embodiment of a fuel cell system in accordance with aspects of the invention.

If the temperature of the fuel cell 110, as may be monitored by the thermal sensor 182, decreases to the pre-determinate value $t_1$, an active phase of a method can be implemented according to aspects of the invention. Various steps of the active phase are shown in FIGS. 3-5. A first step of the active phase is shown in FIG. 3. The first step includes the solenoid valve 161 associated with the hydrogen line 152 being opened to allow hydrogen to fill the anode flow field 118 from the hydrogen tank 140 under a pressure controlled with the pressure regulator 141. The solenoid valve 162 associated with the small coolant loop can be opened. The fuel cell 110 can be electrically connected to a load, which can be, for at least this step, the electrical heater 171 and the coolant pump 131. The hydrogen, driven by the electrochemical hydrogen pump effect, can be moved from the anode 112 to the cathode 113 across the PEM 111 at rate in a direct proportion with the hydrogen partial pressure difference between the anode flow field 118 and the cathode flow field 119. The electrochemical reactions occurring at the anode catalyst layer 116 and the cathode catalyst layer 117 can be expressed as follows:

Anode:

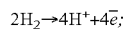

Cathode:

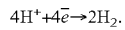

The electrical heater 171, as a recipient of the electrical energy, can start to pre-heat the feed air line 151. The coolant pump 131 can initiate a cooling fluid flow in the small coolant loop.

Referring to FIG. 4, a second step of the active phase of the method can start immediately after the first step to prevent a buildup of hydrogen in the cathode flow field 119. This step can be implemented by supplying the electrical energy to the air blower 130 in a defined proportion to the electrical current generated in the fuel cell 110 in order to maintain the stoichiometric rate of the oxygen, delivered with the feed air, for an exothermal chemical reaction with hydrogen evolving at the cathode catalyst layer 117. The reactions occurring at the anode catalyst layer 116 and the cathode catalyst layer 117 can be expressed as follows:

Anode:

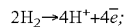

Cathode:

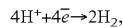

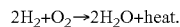

Realized thermal energy can be uniformly distributed in the entire fuel cell 110 by a cooling fluid circulating in the small coolant loop. The electrical current supplied to the electrical heater 171 can be adjusted to maintain a defined temperature $t_3$ of the feed air flow calculated, assuming that the feed air relative humidity as 0%, by means of the controller 190 in order to fully evaporate the water formed in the chemical reaction and, consequently, to prevent flooding of the fuel cell 100. The energy spent in the electrical heater 171 can also contribute toward warming the fuel cell 100. The cathode exhaust, which can be mostly nitrogen, can be pre-warmed by the electrical heater 171 and the hydrogen combustion in the cathode flow field 119, can be directed into the humidifier 120 and, more particularly, into the cathode exhaust compartment 122. Thus, the moisture held by the membrane 123 can be kept at a temperature above 0 degrees Celsius. Thus, freezing of the water is prevented. As a result, the humidifier 120 can be protected against a blockage of its internal passages and damage to the membrane 123. In addition, the cathode exhaust in the humidifier 120 can impart thermal energy to the incoming feed air flowing through the feed air compartment 121, which may result in the conservation of the hydrogen spent in processing the method.

Referring to FIG. 5, a third step of the active phase of the method can be initiated when the temperature of the fuel cell 110 monitored with the thermal sensor 182 increases to a pre-determined value $t_2$ (where $t_2 > t_1$). The third step can be implemented as a number of adjustments of the system 100. Such adjustments can include: closing the solenoid valve 161 in order to cut a flow of the hydrogen into the anode flow field 118 of the fuel cell 110; disabling the air blower 130 to stop the flow of the feed air of the cathode flow field 119; disconnecting the electrical heater 171; and/or decreasing the current in the electrical external circuit to a value providing the hydrogen to the cathode catalyst layer 117 by means of the electrochemical hydrogen pump in an amount to support the chemical reaction with residual oxygen moving to the cathode catalyst layer 117 from the feed air line 151 and the feed air compartment 121 of the humidifier 120 due to a gradient in the oxygen concentration. The reactions occurring at the anode catalyst layer 116 and the cathode catalyst layer 117 can still be the same but in fade mode:

Anode:

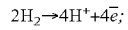

Cathode:

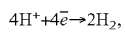

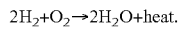

The third step of the active phase of the method can be executed at for a defined time, depending on specific features of the system 100. Such features can include, for instance, the length of the feed air line 151, the volume of the feed air compartment 121 of the humidifier 120, i.e., to fully consume the oxygen at the cathode catalyst layer 117. Then, the system 100 can enter in the passive phase of the method, as described above in connection with FIG. 2, unless a temperature of the fuel cell 110 monitored with the thermal sensor 182 is equal or less the pre-determined value $t_1$. The full depletion of the oxygen in the cathode flow field 119 can protect the cathode 113 against being exposed to the oxygen potential during the passive phase of the method and, as a result, against accelerated corrosion in the materials of the cathode diffusion substrate 115, the cathode catalyst layer 117 and the cathode flow field 119.

In the passive phase of the method, the thermo-insulation case 184, 185 of the fuel cell 110 and the humidifier 120 can suppress heat radiation to the environment, thereby decreasing a number of the active phases of the method and, consequently, conserving the hydrogen as a fuel for the fuel cell 110.

It will be understood that the invention is not limited to the specific details described herein, which are given by way of example only, and that various modifications and alterations are possible within the scope of the invention as defined in the following claims.

What is claimed is:

1. A method of protecting a shut down proton exchange membrane fuel cell against freezing, said fuel cell system having a fuel cell with a proton-exchange membrane between a cathode and an anode, an external electrical circuit operatively connected to said cathode and said anode; a feed air supply in fluid communication with said cathode by a cathode line and operatively connected to said external electrical circuit; a hydrogen fuel source in fluid communication with said anode by an anode line; an electrical heater associated with said cathode line and operatively connected to said external electrical circuit; a sensor operatively positioned to measure a temperature of the fuel cell, wherein, when the temperature of said fuel cell measured by the sensor is below a predetermined value that is greater than 0 degrees Celsius, the method comprises the steps of:

supplying hydrogen from said fuel source to said anode;
connecting said anode and said cathode of said fuel cell to said external electrical circuit;
dissociating the hydrogen at said anode into hydrogen ions and electrons;
conducting an electrical current as a flow of the electrons along said external electrical circuit to said cathode;
passing the hydrogen ions from said anode through said proton-exchange membrane to said cathode;
combining the hydrogen ions with the electrons to generate hydrogen at said cathode;
exothermal chemical reacting the hydrogen generated at said cathode with oxygen supplied by said feed air supply at rate of about the stoichiometric ratio for the chemical reaction;
warming the feed air with said electrical heater, the electrical heater being powered at least in part by the electrical current conducted along the external electrical circuit; and
distributing at least some of the heat generated in the exothermal chemical reacting step to the fuel cell.

* * * * *